US011117391B2

(12) United States Patent
Illsley et al.

(10) Patent No.: US 11,117,391 B2
(45) Date of Patent: Sep. 14, 2021

(54) UV-CURABLE INKJET AND OVERPRINT VARNISH COMBINATION

(71) Applicants: SUN CHEMICAL CORPORATION, Parsippany, NJ (US); Derek Illsley, Bath (GB); Nigel Anthony Caiger, Wells (GB)

(72) Inventors: Derek Illsley, Bath (GB); Nigel Anthony Caiger, Wells (GB)

(73) Assignee: Sun Chemical Corporation, Parsippany, NJ (US)

( * ) Notice: Subject to any disclaimer, the term of this patent is extended or adjusted under 35 U.S.C. 154(b) by 313 days.

(21) Appl. No.: 14/777,614

(22) PCT Filed: Mar. 19, 2014

(86) PCT No.: PCT/US2014/031214
§ 371 (c)(1),
(2) Date: Sep. 16, 2015

(87) PCT Pub. No.: WO2014/165323
PCT Pub. Date: Oct. 9, 2014

(65) Prior Publication Data
US 2016/0271970 A1    Sep. 22, 2016

Related U.S. Application Data

(60) Provisional application No. 61/807,919, filed on Apr. 3, 2013.

(51) Int. Cl.
B41J 11/00    (2006.01)
C09D 11/101   (2014.01)
(Continued)

(52) U.S. Cl.
CPC ............. *B41J 11/0015* (2013.01); *B41J 2/01* (2013.01); *B41M 5/0023* (2013.01);
(Continued)

(58) Field of Classification Search
None
See application file for complete search history.

(56) References Cited

U.S. PATENT DOCUMENTS 4,113,593 A  *  9/1978 Barzynski ............ C09D 11/101
                                                            428/203
5,407,708 A  *  4/1995 Lovin .................... B41F 5/24
                                                            101/212

(Continued)

FOREIGN PATENT DOCUMENTS

CA         2561767 A1    10/2005
WO    WO 2001/094451 A2    12/2001
(Continued)

OTHER PUBLICATIONS

International Preliminary Report on Patentability from International Application No. PCT/US2014/031214 dated Oct. 6, 2015.
(Continued)

*Primary Examiner* — Laura C Powers
(74) *Attorney, Agent, or Firm* — Marian E. Fundytus; Ostrolenk Faber LLP.

(57) ABSTRACT

A process for preparing printed matter is disclosed which comprises applying first a UV-curable ink containing photoinitiators followed by an overprint varnish and then UV curing such as the amount of photoinitiators is less than 6% by weight of the total weight of the ink. The present invention relates to a printing process by applying first a UV-curable ink followed by an overprint varnish (OPV) and curing.

22 Claims, 1 Drawing Sheet

(51) Int. Cl.
*C09D 11/322* (2014.01)
*B41M 5/00* (2006.01)
*B41M 7/00* (2006.01)
*B41J 2/01* (2006.01)

(52) U.S. Cl.
CPC ........ *B41M 7/0045* (2013.01); *B41M 7/0081* (2013.01); *C09D 11/101* (2013.01); *C09D 11/322* (2013.01)

(56) References Cited

U.S. PATENT DOCUMENTS

| 2002/0119295 A1* | 8/2002 | Speer ........................ B41M 5/44 428/195.1 |
| 2007/0132823 A1 | 6/2007 | Barreto et al. |
| 2010/0227075 A1* | 9/2010 | Belelie ................. B41M 7/0081 427/492 |
| 2011/0274891 A1* | 11/2011 | De Rossi ................. B05D 5/06 428/195.1 |

FOREIGN PATENT DOCUMENTS

| WO | WO 2007/017644 A1 | 2/2007 |
| WO | WO 2010/150023 A1 | 12/2010 |
| WO | WO 2011/021051 A1 | 2/2011 |
| WO | WO 2013/019821 A1 | 2/2013 |

OTHER PUBLICATIONS

Notification Concerning Transmittal of the International Search Report and the Written Opinion of the International Authority or the Declaration issued in PCT/US2014/031214, dated Aug. 18, 2014.
European Search Report issue in European Application No. 14779954.8, dated Jan. 2, 2017.

* cited by examiner

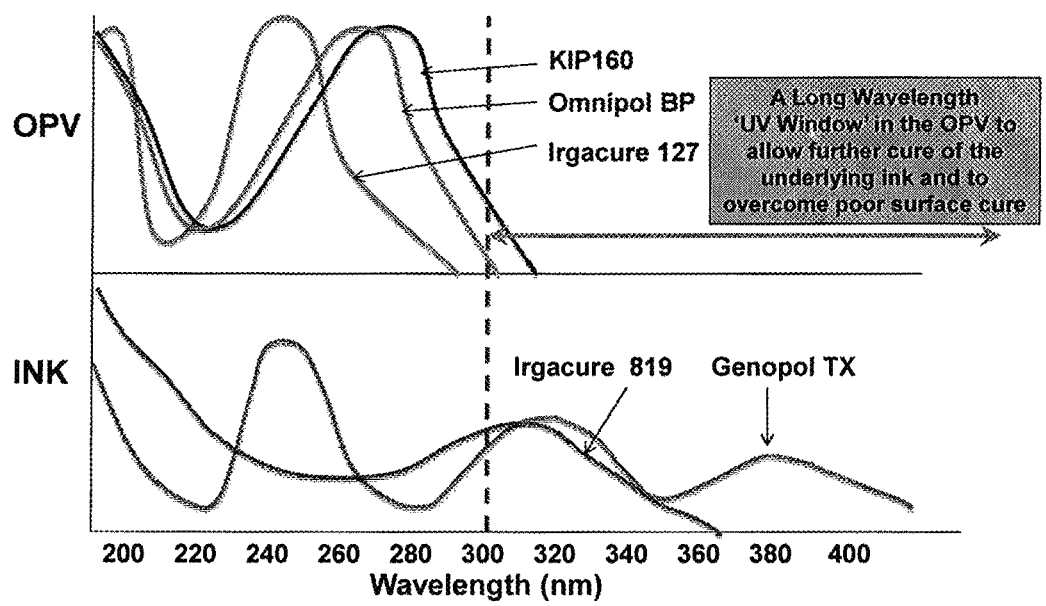

UV-CURABLE INKJET AND OVERPRINT VARNISH COMBINATION

CROSS REFERENCE TO RELATED APPLICATIONS

The present application is a § 371 National Phase application based on PCT/US2014/031214 filed Mar. 19, 2014, which claims the benefit of U.S. Provisional Application No. 61/807,919, filed Apr. 3, 2013, the subject matter of each of which is incorporated by reference in their entirety.

FIELD OF THE INVENTION

The present invention relates to a printing process by applying first a UV-curable ink followed by an overprint varnish (OPV) and curing.

BACKGROUND OF THE INVENTION

The patent literature describes UV-curable inkjet fluids having the potential to be printed on food packaging.

Specifically, WO2009/053348 describes how UV-curable fluids having low migration potential can be formed by combining a specific blend of mono-, and difunctional acrylates, a polymerizable component containing both an acrylate and a vinyl ether group (specifically 'VEEA'; 2-(2-vinyloxyethoxy)ethyl acrylate), along with curable materials having greater than 3 polymerizable groups. It discloses that polymeric, polymerizable and multifunctional photoinitiators (PIs) may also be used.

WO2009/030658 describes a blend of photoinitiators (PI's) having a low migration potential, with the proviso that the compositions contain an aromatic polymerizable tertiary amine co-initiator. However, like WO2009/053348 this patent does not describe how to achieve acceptable migratable levels from pigmented inkjet fluids when cured in air.

One of the major issues associated with UV-curable inks, especially UV-curable inkjet fluids, is that of oxygen inhibition. Due to the particularly low viscosity of inkjet fluids, and to a lesser extent other UV-curable (free radical) inks and coatings, such fluids are especially prone to oxygen inhibition, which slows the cure response of the ink. To overcome this problem with oxygen inhibition of free radically polymerizable UV-curable inkjet compositions, it is normal for an inkjet fluid to contain up to 10% (w/w) or more of a blend of photoinitiators based on the total weight of the composition to produce a sufficient radical flux under the action of UV-light to overcome the effect and enable a sufficiently cured ink film to be produced. The consequence of using such high concentrations of photoinitiators in an inkjet composition is that not only does it make the final inkjet product more costly (as photoinitiators are a particularly expensive component of the ink) but it can also negatively impact upon the viscosity of the ink and also upon the final properties of the cured ink. For inkjet fluids, there is a continuing drive towards products having lower viscosities as inkjet print head designs evolve. For example, the KJ4A series print heads from Kyocera require inks having viscosities of 7.0 mPa·s or lower at 40-45° C.

An alternative way of overcoming the oxygen inhibition effect experienced by UV-curable (free radical) inkjet and other coating compositions is to exclude the majority of the oxygen by performing the cure under a blanket of nitrogen (or carbon dioxide). Obviously, this is not a desirable approach as it requires specially designed and manufactured presses, and the generation and use of these inerting gases can be prohibitively costly.

SUMMARY OF THE INVENTION

The present invention provides a printing process comprising:
 (a) applying a UV-curable ink on a substrate;
 (b) applying UV to partially cure the UV-curable ink of step (a);
 (c) applying an overprint varnish (OPV) on the partially cured UV-curable ink; and
 (d) applying UV to cure the ink,
wherein, the ink comprises one or more photoinitiators and the amount of photoinitiators in the ink is less than 6% by weight of the total weight of the ink.

The present invention also provides a printed substrate produced by the process of the present invention.

The present invention further discloses an article coated or printed with a first layer of ink and a second layer of OPV on top of the first ink layer, wherein the ink comprises one or more photoinitiators and the amount of photoinitiators in the ink is less than 6% by weight of the total weight of the ink.

These and other objects, advantages, and features of the invention will become apparent to those persons skilled in the art upon reading the details of the methods and formulations as more fully described below.

BRIEF DESCRIPTION OF THE DRAWING

FIG. 1 shows the Concept of a Mutual UV-Curable INK/Overprint Varnish Combination. KIP 160 and Irgacure 127=hydroxy-ketone type photoinitiators; Omnipol BP=Polymeric Benzophenone type photoinitiator; Irgacure 819=bis-Phosphine oxide photoinitiator; and Genopol TX=Polymeric Thioxanthone type photoinitiator.

DETAILED DESCRIPTION OF THE INVENTION

The major problem associated with oxygen inhibition is related with the very topmost part of the ink layer. The reason is that inks which can be formulated with reduced concentrations of photoinitiators, have acceptable through-cure but with poor surface cure. Clearly, such an ink by itself would be unacceptable because the uncured ink material at the surface could cause problems with ink transfer to contacting surfaces, and would be a particular problem if the ink was to be used for food packaging. However the present invention allows for such poor surface-curing inks to be successfully employed. This is achieved by applying an OPV layer (preferably UV-curable) onto a previously partially cured or ink layer, and then exposing the combined ink-OPV bi-layer to further UV irradiation. The OPV is formulated in such a way that it is not prone to poor surface cure and by applying it over the ink allows the poorly cured top layer of the ink to become fully cured as it is now well protected from atmospheric oxygen by the overlaying OPV. A further benefit of this approach is that as the ink-OPV bilayer is exposed to this second dose of UV-irradiation it results in further radical generation throughout the underlying ink layer resulting in further conversion of unreacted monomer and oligomer.

Therefore, it is highly desirable to formulate inks, especially inkjet fluids having a lower concentration of photoinitiator whilst still achieving acceptable cure responses under ambient atmospheric conditions. A further advantage of UV-curable (free radical) inks having lower concentrations of photoinitiator will be that they will result in lower concentrations of both unreacted photoinitiator and also of photoinitiator decomposition products. This will have the result of cured ink films having lower odor and also of inks, which when cured, having lower levels of unbound (residual) photoinitiator and photoinitiator decomposition by-products that could otherwise cause contamination of foodstuffs packaged with matter printed using such inks.

For the purpose of this invention, a photoinitiator is defined as a substance (other than reactant) which, on absorption of light, generates a reactive species (ion or radical), initiates a chemical reaction or transformation, and is consumed. A synergist such as an amine synergist is not a photoinitiator because, by itself, is not able to generate reactive (free radical) species, but relies on the action of a photonitiator to generate a reactive radical species by a chain transfer process.

OPV, preferably UV-cured, is applied over UV-cured inks to provide the required gloss, resistance properties, slip, etc. The OPV itself acts to protect the underlying (partially cured) ink from oxygen and thence allowing cure of the ink to be achieved when the OPV itself is UV-cured. According to the present invention, rather than using an inert gas to protect the ink from atmospheric oxygen and its deleterious effect upon the UV-cure response of free radically polymerizable inkjet (or indeed other UV-curable ink compositions), it is also possible to shield the surface of a wet ink by placing a film of some sorts over it, whether this be a glass slide or a plastic membrane. Thus, the present invention conceived of a situation where the surface cure of an ink is particularly poor but the conversion of the ink can be improved by protecting that surface in some way so as to exclude much of the oxygen from the ink surface that might otherwise induce problems of oxygen inhibition. The OPV is preferably transparent in the longer wavelengths typical of photoinitiators, such as phosphine oxide and thioxanthone types typical of the graphic arts industry, such that an ink which uses longer wavelength absorbing PIs could be further cured when the OPV itself is cured, as is expressed in the diagram below. This is particularly relevant if the OPV consists largely of PIs (for example benzophenone and hydroxyl-ketone types) with principal absorption bands below 300 nm (longer wavelength absorbing photoinitiators not being necessary as there is no pigment to require their use). In a preferred embodiment, the OPV's of the present invention would be free of colorants, but it would be possible to incorporate colorants (pigments, dyes, fluorescent markers), though preferably in small amounts (e.g. <1%), though larger amounts of colorants in the OPV's would also be possible.

The UV-curable OPV could be of any type, ink-jettable, or printable by other common methods such as flexographic, gravure or offset printing processes. Indeed, the higher viscosity overprint varnishes of the flexo, gravure and offset types would be less prone to oxygen inhibition allowing for faster printing (press) speeds. Furthermore, these higher viscosity OPVs can be formulated on higher concentrations of more highly (acrylate) functional components than a jettable fluid and this also helps to promote the UV-cure response of these fluids, allowing faster press speeds to be achieved. Therefore, the advantages of this highly novel approach is that it allows the printing of substrates with UV-curable (free radical) inkjet compositions, containing reduced concentrations of photoinitiator, compared with the norm, under ambient atmospheric conditions at similar or even faster press speeds than would be possible otherwise. It is envisaged that this would be achieved via an in-line process, whereby the ink of the invention is "pinned" by a minimal UV-dose prior to the OPV of the invention being applied over it and the combined layer then subjected to further UV-irradiation to bring about the full cure of the combined layer. The OPV can be applied by a printing process selected from the group consisting of inkjet, flexographic printing, gravure printing, offset printing and roller coating.

UV pinning is the process of applying a dose of low intensity UV light to a UV-curable ink. As a result, the ink droplets move to a higher viscosity state, but stop short of full cure. This is also referred to as the "gelling" of the ink.

Where the inks and OPV's of the invention are prepared from components approved for the printing of food packaging, then the printing of such packaging can also be achieved. The coated or printed articles of the present disclosure may be for food packaging, pharmaceutical, and personal care applications.

In one embodiment, the present invention allows for the printing of food packaging under ambient (air) conditions, using pigmented inkjet fluids containing less than 6.0%, preferably less than 5%, more preferably less than 4% and most preferably less than 3% (w/w) of total photoinitiator, excluding amine synergists, at preferable UV-doses of 200 mJ/cm2, or less, which is a significant breakthrough.

It can be seen from FIG. 1 that if the OPV is preferably composed largely of those photoinitiators having their principal absorbance maxima of less than 300 nm, then any UV radiation of wavelengths 300 nm and greater may penetrate the OPV layer to reach the underlying ink layer(s). This penetrating radiation is then available to cure the ink further and especially the top most layer of that ink which might otherwise be poorly cured as a result of oxygen inhibition.

As discussed above, the application of a UV-curable OPV over an underlying ink is used to protect that ink from oxygen in the atmosphere so that when subjected to a second UV exposure the ink becomes more fully cured. However, it is recognized that a conventional water-based or solvent-based, non UV-curable, OPV could be applied to the ink surface which would thereby shield the ink from the atmosphere and then allow the more thorough cure of the underlying ink in the second UV-curing step. However, this approach would add undesirable complexity to the process as the water or solvent would need to be removed prior to the final UV-curing process. For this to be achieved, a drying stage would need to be introduced into the process prior to the final UV-curing stage. This would be an undesirable feature in an inkjet press, in particular, as it would necessitate an extended drying zone with the associated handling to remove/capture the evolved water/solvent. Most inkjet printers are not equipped to handle such emissions and therefore the process described by this invention is highly desirable.

As discussed above, UV-curable (free radical) inkjet inks prepared according to the prior art, and intended for the printing of food packaging (as in WO2009/053348) have been shown to cure poorly in air and to produce high levels of migratables from cured ink films, even when cured using high doses of UV-light. Indeed, they only achieve acceptable levels of migratables when cured under nitrogen, a facility which is not commonly available to commercial printers, and also likely to result in unacceptable cost. The ink and OPV combination of the present invention enables low levels of migratable components to be achieved without the need for curing under nitrogen (or other inerting gases), even when the ink-OPV combination is exposed to (total) UV-doses of 250 mJ/cm$^2$, or less.

A further advantage over the prior art is that the inks of the present invention are readily made at viscosities low enough for some of the inkjet print heads entering the market, such as the KJ4A print head from Kyocera.

Another advantage is that the present invention allows for the preparation of materials printed with UV-curable pigmented inkjet fluids at low UV cure doses, which has the potential benefit of producing printed material at fast production press speeds. This is especially the case when suitable flexo, gravure or offset UV-curable varnishes are used as these have acceptable cure responses in their own right at high press speeds, and when applied over inks of the current invention allow the production of printed matter at acceptable low cure doses and press speeds.

Yet a further advantage of the present invention is that it allows for the UV-curing of pigmented inks, preferably inkjet inks, using LED UV lamps at acceptable press speeds since the final cure of the ink and OPV combination is achieved with a conventional medium pressure mercury UV lamps at the end of the process. This is considerably advantageous since the preparation of pigmented inkjet fluids having acceptable UV-cure responses under the action of LED UV-lamps, especially using photoinitiators suitable for food packaging (i.e. those having a low migration potential), is difficult to achieve.

It is clear that the present invention not only lends itself to inkjet inks but may also be applied to other UV-curable (free radical) inks and coatings as the initial layers prior to application of the OPV. This is a new approach for producing printed matter using UV-curable (free radically polymerizable) inkjet, and other inks and coatings fluids. It relies on a combination of a UV-curable pigmented ink, preferably an inkjet fluid, in which the photoinitiator package contains photoinitiators which absorb, and cause initiation, preferably at wavelengths in excess of 300 nm, with a UV-curable OPV in which the photoinitiator package is largely constrained to those photoinitiators whose principal absorptions are preferably below 300 nm. Furthermore, it is preferable that the inks of the present invention contain only those photoinitiators which are recognized for providing through cure.

In a further embodiment of the present invention, it is preferred that the UV-curable inkjet fluid is 'pinned' by a relatively low UV-dose before the OPV of the invention is applied over it and subsequently fully cured. This can be achieved for example by an in-line process whereby the ink is cured, followed shortly thereafter by the application of the OPV of the present invention followed by the UV-cure of the ink-OPV combination.

The ink-OPV combination of the present invention can also be used in applications requiring low migration of unbound components which could otherwise cause unacceptable levels of contamination of any foodstuff.

A further advantage of the present invention is that it allows for faster printing speeds than might be achievable solely with the use of UV-curable pigmented inkjet fluids, especially when the OPV is a more viscous type such as applied by flexographic, gravure or offset processes.

The present invention aims to address a number of problems commonly associated with UV-curable (free radical) inks and especially UV-curable inkjet (pigmented) inks, and furthermore their use in sensitive applications such as food packaging. One of the main problems associated with UV-curable (free-radically polymerizable) inkjet inks is that they suffer particularly from oxygen inhibition. This most often requires the use of a high concentration of photoinitiators compared with other UV-curable ink technologies (e.g. flexo, gravure, offset) to generate a sufficiently intense radical flux to overcome the effects of oxygen inhibition and allow for acceptable cure responses. The cause of this disadvantageous oxygen inhibition, which is a particular problem in the uppermost levels of the ink ('surface cure'), is largely due to the low viscosity of inkjet fluids which results in rapid diffusion of oxygen into the polymerizing fluid.

To overcome the problem of oxygen inhibition, other than by using high concentrations of photoinitiators, the use of nitrogen (and carbon dioxide) inerting has also been proposed. This approach relies on a blanket of nitrogen being purged over the printed substrate prior to, and during UV-cure, thereby excluding the majority of the oxygen from the UV-cure zone to facilitate the cure.

The UV-cure response, and in particular the surface cure, of an ink having low concentrations of photoinitiators is by itself poor when cured in air. However, by applying a UV-curable OPV over the ink and then curing the combined ink-OPV layer, it results in a well-cured combined layer. The OPV itself acts as means to slow the ingress of oxygen into the underlying ink layer thereby allowing it to more fully cure under the OPV when the OPV is UV-cured. To allow this combination of UV-curable ink and OPV to work effectively, it is preferable that the OPV contains mostly those photoinitiators whose principal peak absorptions are at wavelengths of less than 300 nm and that the ink contains photoinitiators having effective (initiating) absorption at greater than 300 nm. Preferably, the OPV's and inks would be comprised of a photoinitiator package of >50% of the aforementioned specified absorption wavelengths (OPV <300 nm; inks >300 nm), more preferably >65%, still more preferably >85%, and most preferably 100%. This is perhaps best expressed as the OPV having a UV 'window' through which UV light can penetrate and then further cure the underlying ink. Examples of other photoinitiators that could be used in combination with the preferred photoinitiators in the OPV's of the present invention include, but are not limited to phosphine oxide types, thioxanthone and its derivatives, alpha amino alkyl ketone types. Examples of other photoinitiators that could be used in combination with the preferred photoinitiators in the inks of the present invention include, but are not limited to hydroxy-ketone types, benzophenone and its derivatives, benzoin ethers, benzyl ketals.

FIG. 1 gives a better expression of this concept; showing in a diagrammatic form (not normalized) examples of the types of photoinitiator that could be used in an ink and OPV of the present invention. This is merely for illustrative purposes only and should not be construed as limiting in any way as it will be clear to anyone skilled in the art that there are many photoinitiators that could be used in the preparation of the ink and OPV.

Examples of photoinitiators that can be used in the preparation of the OPV of the present invention include, but are not limited to those of the benzophenone, hydroxy-ketone, benzyldimethyl ketal, phenylglyoxalate, benzoin, benzoin ethers, dialkoxyacetophenone types, and blends thereof.

Examples of photoinitiators that can be used in the preparation of the ink of the present invention include, but are not limited to those of the thioxanthone, phosphine oxide, α-aminoketone, 4,4'-Bis(alkylamino)benzophenone, 4-(Dialkylamino)benzophenone, and anthraquinone types, and blends thereof.

A suitable reference source for the associated UV absorption spectra of these photoinitiators is that provided by Sigma Aldrich. (http://www.sigmaaldrich.com/etc/medialib/docs/Aldrich/Brochure/al_pp_spectra.Par.0001.File.t mp/al_pp_spectra.pdf).

It is preferable that the larger portion of the photoinitiators contained in the OPV have their principal absorption maxima at wavelengths less than 340 nm, preferably at less than 320 nm and more preferably at less than 300 nm. It is preferred that the OPV, which when applied over the ink, has a UV-absorbance of less than 1.0 at wavelengths greater than 340 nm.

It is desirable that a portion of the photoinitiators used in the preparation of the ink component would have absorption bands with peak maxima at greater than 340 nm, preferably greater than 320 nm, and more preferably greater than 300 nm.

In a further embodiment, the OPV's of the present invention preferably would have photoinitiator blends where greater than 50% (w/w) of that blend are formed from photoinitiators whose principal absorption bands are below 300 nm. More preferably, the concentration of photoinitiators having their principal absorbances below 300 nm should form greater than 65% (w/w) of the total photoinitiator blend and most preferably favorably greater than 80% (w/w).

In a further embodiment, the inks of the present invention preferably would have photoinitiator blends where greater than 50% (w/w) of that blend are formed from photoinitiators whose principal absorption bands are above 300 nm. More preferably, the concentration of photoinitiators having their principal absorbances above 300 nm should form greater than 65% (w/w) of the total photoinitiator blend and most preferably favorably greater than 80% (w/w).

It is preferred that the total concentration of photoinitiators used in the preparation of inks of the current invention (excluding amine-functional synergists) is less than 6% (w/w), more preferably less than 5% (w/w) and most preferably less than 4% (w/w).

Where the ink-OPV combination of the present invention is applied to food packaging, it is preferred that the photoinitiators used in their preparation are of low migration potential and accepted as being suitable for this application and include polymeric types such as thioxanthone, benzophenone, and α-aminoketone types reacted onto polymeric moieties, such as poly(alkylene oxides). Such photoinitiators are available from IGM under the Omnipol trade name and from Rahn under the Genopol trade name. Other photoinitiators having recognized low migration potential may also be used and include difunctional hydroxy-ketone and bis-phosphine oxide types as denoted by the chemical structures below;

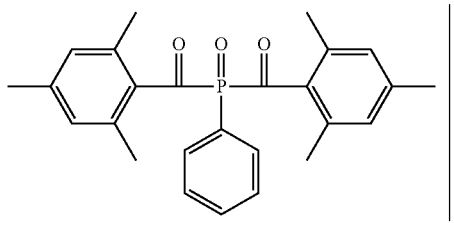

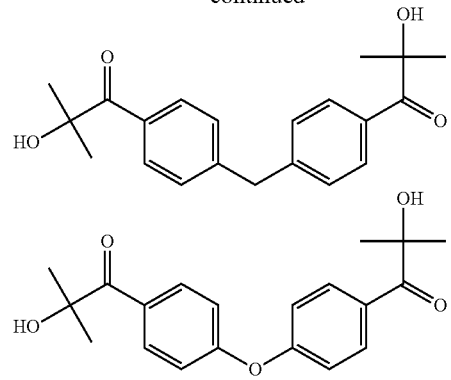

Where the ink-OPV combination of the present invention is used in the printing of food packaging, the inks and OPV's are preferably not only be prepared using photoinitiators having low migration potential, but should also preferably be formulated using monomer and oligomer blends that achieve acceptably low levels of contamination of the contained foodstuff. It is preferred that the ink-OPV combination, when cured, causes contamination of any contained foodstuff of less than 10 ppb of any individual component. In the instances where the ink-OPV combination of the invention is intended for the printing of food packaging, the monomers, oligomers, dispersants, additives, and other components should be selected on the basis of their acceptability for such an application. A particularly useful guideline in selecting components for inks intended for food packaging applications is that provided by EUPIA (European Printing Ink Association) in their Inventory list; "COMPRISING OF PACKAGING INK RAW MATERIALS APPLIED TO THE NON-FOOD CONTACT SURFACE OF FOOD PACKAGING".

The present invention is not restricted to any one layer of ink in combination with any one layer of OPV. It should be appreciated that the present invention can combine any number of inks and OPV layers, so long as there is sufficient transparency in the UV spectrum at wavelengths greater than 300 nm of the overlying OPV to allow the cure of the underlying ink. As an example of a multilayer combination of the present invention a white ink of the present invention could be applied first, followed by any combination of inks of different colors followed by an OPV or more than one OPV layers according to the current invention.

In a further aspect of the current invention, the OPV component also provides functionality that is not achievable by the inks alone. Thus, for example, the OPV can be modified to provide the required slip, abrasion resistance, chemical resistance required of the printed ink-OPV combination. As with most coating compositions, additives may be incorporated to enhance various properties. A partial list of such additives includes but is not limited to adhesion promoters, light stabilizers, de-gassing additives, flow promoters, defoamers, antioxidants, UV stabilizers, surfactants, dispersants, plasticizers, rheological additives, waxes, silicones, matting agents, etc.

In a further embodiment of the invention, the UV-curable (free radical) ink is preferably a pigmented inkjet fluid having a viscosity of less than 15.0 mPa·s at 50° C. as measured using a Brookfield DV-II+ Pro Viscometer equipped with Spindle #18, at 100 rpm, and more preferably a viscosity of less than 12.0 mPa·s at 50° C. In yet a further embodiment, the inkjet ink of the invention has a viscosity of less than 8.0 mPa·s at 45° C., and even more preferably less than 7.0 mPa·s at 45° C. In another embodiment of the invention the inkjet inks of the invention have viscosities of less than 7.0 mPa·s at 40° C. Viscosities of the inks were measured using a Brookfield DV-II+ Pro Viscometer equipped with Spindle #18, at 100 rpm.

A further embodiment of the photoinitiators contained in the overprint OPV is that they preferably have absorbances of less than 0.1 (for 0.01% (w/w) solutions in acetonitrile or other suitable solvent) at wavelengths greater than 340 nm. For the inks, it is further preferred that they incorporate photoinitiators having absorbances of greater than 0.1 (for 0.01% (w/w) solutions in suitable solvents) at wavelengths greater than 340 nm.

Absorbance is a quantitative measure expressed as a logarithmic ratio between the radiation falling upon a material and the radiation transmitted through a material:

$$A_\lambda = -\log_{10}\left(\frac{I_1}{I_0}\right),$$

where $A_\lambda$ is the absorbance at a certain wavelength of light ($\lambda$), $I_1$ is the intensity of the radiation (light) that has passed through the material (transmitted radiation), and $I_0$ is the intensity of the radiation before it passes through the material (incident radiation).

Outside the field of analytical chemistry, e.g. when used with the Tunable Diode Laser Absorption Spectroscopy (TDLAS) technique, the absorbance is often defined using the natural logarithm instead of the common logarithm, i.e. as $$A_\lambda = -\ln(I_1/I_0)$$

where $I_1$ is the intensity of light at a specified wavelength $\lambda$ that has passed through a sample (transmitted light intensity) and $I_0$ is the intensity of the light before it enters the sample or incident light intensity (or power).

The term absorption refers to the physical process of absorbing light, while absorbance refers to the mathematical quantity. Also, absorbance does not always measure absorption: if a given sample is, for example a dispersion, part of the incident light will in fact be scattered by the dispersed particles, and not really absorbed. However, in such cases, it is recommended that the term "attenuance" (formerly called "extinction") be used, which accounts for losses due to scattering and luminescence. See the Beer-Lambert Law for a more complete discussion.

Although absorbance is properly unitless, it is often reported in "Absorbance Units" or AU. However, many people, including scientific researchers, wrongly state the results from absorbance measurement experiments in terms of arbitrary units.

Logarithmic Vs. Directly Proportional Measurements.

The amount of light transmitted through a material diminishes exponentially as it travels through the material. Since the absorbance of a sample is measured as a logarithm, it is directly proportional to the thickness of the sample and to the concentration of the absorbing material in the sample. Some other measures related to absorption, such as transmittance, are measured as a simple ratio so they vary exponentially with thickness and concentration of the material as shown in Table 1.

TABLE 1

Relationship between and transmittance

| Absorbance | Transmittance ($I/I_0$) | % Transmittance (100* $I/I_0$) |
|---|---|---|
| 0 | 1 | 100 |
| 0.1 | 0.79 | 79 |
| 0.25 | 0.56 | 56 |
| 0.5 | 0.32 | 32 |
| 0.75 | 0.18 | 18 |
| 0.9 | 0.13 | 13 |
| 1 | 0.1 | 10 |
| 2 | 0.01 | 1 |
| 3 | 0.001 | 0.1 |

Before application of the OPV component of the present invention, the inks can be cured under the action of the UV light emitted from any source, so long as they emit at wavelengths that can interact with the photoinitiators of the ink; including medium pressure mercury lamps and LED lamps. The UV-dose that the ink should be initially exposed to is not restricted, only that it be sufficient to 'pin' the ink layer and prevent significant bleed when the OPV is applied over it. However, the UV-dose should preferably be greater than 10 mJ/cm$^2$ (as measured by a calibrated International Light Technologies ILT 490 Profiling Belt Radiometer (covering the UV-A and UV-B ranges), and more preferably greater than 25 mJ/cm$^2$. There is no restriction on the UV-dose that the OPV should be exposed to, only that it should be sufficient to ensure the satisfactory cure of the OPV and ink and that the UV-light source have emissions able to interact with the photoinitiators of both the OPV and ink components of the invention. However, it is preferred that the total UV-dose that the ink-OPV layer be exposed to is greater than 25 mJ/cm$^2$, more preferably greater than 50 mJ/cm$^2$. It is preferred that the total UV-dose that the ink-OPV layer be exposed to should not be greater than 400 mJ/cm$^2$, and preferably not greater than 300 mJ/cm$^2$ and still more preferably not greater than 250 mJ/cm$^2$.

In a further embodiment of the present invention, an in-line process for the preparation of printed matter by the ink-OPV combination of the invention is employed. This process encompasses the deposition of the ink component first, with subsequent preliminary (or 'pinning') UV-cure, followed by the deposition of the OPV component of the invention, with subsequent cure of the ink-OPV layer with a suitable dose of UV-light. This in-line process will help prevent any issues that might occur with transfer of any uncured ink from a partially cured surface before application of the OPV, which would be the case if the printed matter was to be reeled or stacked prior to the application of the OPV component.

It would also be possible to achieve the object of the present invention (finished prints with low migratables) by removing the photoinitiators from either (or both) of the overprint OPV's and inks and curing by electron beam (EB) radiation. However, this is not a viable option for most printers as it would require a complete retrofit of existing equipment with the addition of EB curing units.

The present invention could be applicable to virtually any substrates, including for example plastics—e.g. polyester, polyethylene, polypropylene, polyamide, poly(lactic acid), cellulose film, or any coated or pretreated film thereof. Other plastic substrates to consider also include vinyl (PVDC types and copolymers), acrylics (e.g. PMMA), polycarbonate, PEN (poly(ethylene naphthalate); Metals—e.g. steel, aluminum and its alloys, tin and tin coated metals; glass, etc.

Preferably, the substrates used in the present invention would not be highly permeable to air, so that it is sufficient to prevent oxygen inhibition on the reverse side of the ink to the varnish, i.e. the substrate-ink interface.

The present invention has been described in detail, including the preferred embodiments thereof. However, it will be appreciated that those skilled in the art, upon consideration of the present disclosure, may make modifications and/or improvements on this invention that fall within the scope and spirit of the invention.

EXAMPLES

The following examples illustrate specific aspects of the present invention and are not intended to limit the scope thereof in any respect and should not be so construed.

Ink Preparation

The inks were prepared by mixing the pigment dispersion with the ink components using a Silverson type disperser for 20 minutes. The inks were then filtered to remove any oversized particles that might be present in the ink.

Viscosity Measurements

The viscosities of the inks were measured using a Brookfield DV-II+ Pro Viscometer equipped with Spindle #18, at 100 rpm.

UV-Cure Response

The cure response of the inks was determined by applying 12 μm films to Leneta opacity charts (Form 2A) using a calibrated K-Bar (ex. RK Print). The coated charts were then passed through a Fusion UV Systems UV-Rig equipped with a medium pressure H-bulb. The belt speed was adjusted so that the UV-dose, as measured by a calibrated International Light Technologies ILT 490 Profiling Belt Radiometer (covering the UV-A and UV-B ranges), was about 50 mJ/cm$^2$. The number of passes through the rig to achieve both surface and through cure were then recorded allowing the UV-dose level to achieve cure to be determined. Surface cure was assessed by gently drawing a cotton wool bud across the surface of the print, full cure being determined as being the point at which no surface defects were observed. Through cure was assessed by dragging a 1.5 mm wide wooden dowel across the surface of the ink with an approximate downward load of 5 Kg. Through cure was determined as being the point at which the dowel was not able to penetrate through to the underlying surface of the Leneta Chart.

Where the ink films were cured under the action of a UV LED-lamp, prior to the application of the UV-curable OPV, a Nordson Conveyor, equipped with an Integration Technology LEDZero Solidcure lamp, emitting at 395 nm, with a nominal peak irradiance of 10 W/cm$^2$ was used. The UV-dose that the inks were exposed to was measured using a calibrated International Light Technologies ILT 400 Profiling Belt Radiometer (measuring in the BVA range; 275-485 nm).

Curing the Inks and OPV's for Migration Testing

The inks were applied to 36 μm Melinex S (a polyester film) at 12 μm. The inks were then cured at specific UV-doses through the UV-rigs described previously. The OPVs of the invention were applied at 8 μm and cured at specific UV-doses through the UV-rig, equipped with the medium pressure mercury H-bulb, described previously. The prints were then stacked for 2 hours before performing the migration test described below.

Assessing the Level of Migratable Species

The level of contamination from a print surface was determined by a 'set-off' migration test. This test involved blocking 90 cm$^2$ of the printed surface to a 30 micron sheet of LDPE (low-density poly(ethene)), at 10 tonnes for a period of 72 hours. It has been shown that blocking the printed ink film for any longer than this, up to 21 days, does not result in any significant difference in the levels of migratables. The poly(ethene) film was then extracted into 2 ml of methanol, containing 0.025% (w/w) of MEHQ (stabilizer) for 3 hours before the methanol solution was analyzed by GC-MS. Soaking the film for 24 hours, or incubating the film in the extracting methanol at 40° C. for 5 hours, made no significant difference in the level of migratables detected by this technique. The GC-MS was calibrated with known solutions of the analytes (monomers, oligomers, photoinitiators and photoinitiator decomposition products) and the results are reported as ppb (parts per billion), the amount of migratable material that would be present in 1 Kg of food according to the EU packaging model, where it is assumed that 600 cm$^2$ of substrate is required to package 1 Kg of food.

Ink Examples 1 and 2

Ink Examples 1 and 2 were prepared according to the procedure above with compositions as indicated in Table 2.

TABLE 2*

Composition of Ink Examples 1 and 2.

| Component | Ink Example 1 | Ink Example 2 |
|---|---|---|
| DPGDA | 21.3 | 10.8 |
| 3-MePDDA | 30.0 | 30.0 |
| VEEA | 30.0 | 35.0 |
| DDA | — | — |
| CN3715LM | 1.0 | 1.0 |
| Genopol TX | 3.0 | 2.0 |
| Irgacure 819 | 2.5 | 2.5 |
| Genorad 16 | 1.2 | 1.2 |
| Black Dispersion 1 | 11.0 | — |
| Magenta Dispersion 1 | — | 17.5 |
| Total | 100.0 | 100.0 |
| Viscosity @ 45° C. (mPa · s) | 5.70 | 6.33 |

*Notes to Table 1
DPGDA = Dipropylene glycol diacrylate
3-MePDDA = 3-Methylpentanediol Diacrylate
VEEA = 2-(2-vinyloxyethoxy)ethyl acrylate
DDA = Decanediol diacrylate
CN3715LM = Acrylate amine, ex. Sartomer
Genopol TX = Polymeric Thioxanthone (ex. Rahn)
Irgacure 819 = bis-phosphine oxide photoinitiator, ex. BASF
Genorad 16 = Stabilizer, ex. Rahn
Black Dispersion 1 = a dispersion containing 25.0% (w/w) of Special Black 350, the remainder comprising the dispersant (Efka 7476), stabilizers and DPGDA
Magenta Dispersion 1 = a dispersion containing 21.0% (w/w) of Pigment Red122, the remainder comprising the dispersant (Solsperse 39000), stabilizers, and NPG(PO)DA (Propoxylated neopentylglycol diacrylate).

OPV Example 1

Table 3 provides the detail of OPV Example 1, a UV-curable OPV, having a viscosity suitable for application by Inkjet printing and in accordance with the present invention.

TABLE 3*

Composition of UV-Curable OPV Example 1.

| Component | OPV Example 1 |
|---|---|
| TMO(EO)3TA | 25.0 |
| DDA | 26.9 |
| DPGDA | 30.0 |
| CN3715LM | 7.5 |

TABLE 3*-continued

Composition of UV-Curable OPV Example 1.

| Component | OPV Example 1 |
|---|---|
| Omnipol 682 | 5.0 |
| KIP160 | 1.5 |
| Irgacure 127 | 2.5 |
| Genorad 16 | 1.2 |
| Tego 410 | 0.4 |
| Total | 100.0 |
| Viscosity @ 50° C. (mPa · s) | 9.5 mPa · s |

*Notes to Table 3
TMP(EO)3TA = Trimethylol (3 mole equivalent of ethoxylation) Triacrylate
Omnipol 682 = Polymeric Benzophenone (photoinitiator); ex. IGM Resins
KIP160 = A difunctional hydroxy-ketone photoinitiator, ex. Lamberti
Irgacure 127 = A difunctional hydroxy-ketone photoinitiator, ex. BASF
Tego Glide 410 = Slip Additive; ex. Evonik.

Table 4 shows the level of migratable components detected from both cured ink films and also cured ink-OPV combinations. The inks and OPVs in these cases were cured under the influence of the medium pressure mercury H-bulb.

TABLE 4*

Migratable Components from UV-Cured Films (Ink Examples 1 and 2, and OPV Example 1).

| Component | Ink Example 1 Cured at 300 mJ/cm$^2$ (H-Bulb) | Ink Example 2 Cured at 300 mJ/cm$^2$ (H-Bulb) | Ink Example 1 cured at 150 mJ/cm$^2$, overprinted with OPV Example 1 cured at 150 mJ/cm$^2$ | Ink Example 2 cured at 150 mJ/cm$^2$, overprinted with OPV Example 1 cured at 150 mJ/cm$^2$ |
|---|---|---|---|---|
| DPGDA | 227 ppb | 48 ppb | 2.4 ppb | <1.0 ppb[4] |
| 3-MePDDA | 340 ppb | 66 ppb | 1.0 ppb | <1.0 ppb |
| VEEA | 67 ppb | 5.9 | 3.5 ppb | 1.0 ppb |
| DDA | — | — | 5.9 ppb | 1.5 ppb |
| Mesitaldehyde[1] | 5.1 | 5.8 | 0.8 ppb | 0.5 ppb |
| TMP(EO)TA | ND[2] | ND | ND | ND |
| CN3715LM | ND | ND | ND | ND |

*Notes to Table 4
[1]Mesitaldehyde is a decomposition product from Irgacure 819
[2]ND = Not detected
3. When a film of OPV Example 1 was cured independently with a dose of 150 mJ/cm$^2$ from a H-bulb, the level of migratable DPGDA and DA were both less than 1.0 ppb.
[4]The lower detection limit for the monomers under test is 1.0 ppb.

Table 4 shows that when Ink Examples 1 and 2, which contain photoinitiators with absorption bands at wavelengths greater than 300 nm, according to the present invention, are cured under the action of the emission from a medium pressure H-bulb UV lamp, they deliver films having high levels of migratable components. This indicates that the ink films are poorly cured. If these inks were applied to food packaging, or other sensitive packaging, it is likely that the high level of migratable components would cause potential problems of contamination with respect to the uncured (and unbound) migratable components. However, when the inks are cured with a dose of 150 mJ/cm$^2$, under the H-bulb and then a OPV prepared according to the present invention is applied over the partially cured ink films and then the whole is subsequently exposed to a further UV-dose (H-bulb) of 150 mJ/cm$^2$, the level of migratable components is significantly reduced compared with the ink films alone, even though the overall UV-dose is the same. The level of migratable components, and in particular that of migratable monomer is an indication of the extent of polymerization of the monomers. So, where the level of migratable monomers is low, as is the case with the inks of the present invention overprinted with the OPV's of the present invention, would suggest that a high level of monomer conversion has been achieved. This finding substantiates the premise that a UV-curable OPV according to the present invention can enable a poorly curing ink (resulting from oxygen inhibition) to become more fully cured in a subsequent curing step since the OPV shields the ink somewhat from the problems of oxygen inhibition, particularly in the uppermost layer of the ink film. This has substantial advantage, particularly for UV-curable inkjet fluids, which because of their low viscosity are especially prone to oxygen inhibition.

Furthermore, by applying the OPV over the inks and subjecting the combined ink-OPV layer to UV-irradiation, it is shown possible to achieve migratables of less than 10 ppb from the cured film. These low levels would allow for the printing of food packaging.

Ink Example 3

A Pigmented Inkjet Ink Having Low Concentrations of Photoinitiator was prepared as indicated in Table 5.

TABLE 5

Composition of Ink Example 3.

| Component | Concentration (%) |
|---|---|
| DDA | 17.8 |
| DPGDA | 30.0 |
| VEEA | 30.0 |
| CN3715LM | 1.5 |
| Irgacure 819 | 2.0 |
| Genorad 16 | 1.2 |
| Magenta Dispersion A | 17.5 |
| Total | 100.0 |
| Viscosity @ 45° C. (mPa · s) | 6.20 mPa · s |

Ink Example 3 shows that the concentration of photoinitiator in a UV-curable (pigmented) inkjet fluid can be reduced to even lower concentrations and yet still deliver low levels of migratable components when overprinted with OPV's according to the present invention and subjected to further UV-curing.

OPV Example 2

OPV Example 2 is identical to OPV Example 1 in all respects apart from that the polymeric benzophenone component, Omnipol 682, was replaced with Omnipol BP (also of IGM resins). The viscosity of the resultant OPV, measured at 50° C., was 10.5 mPa·s.

When Ink Example 3 was cured under the emissions from a medium pressure (H-bulb) UV-light source, a UV-dose of 100 mJ/cm$^2$ was required to achieve satisfactory through cure. However, the surface of the ink remained tacky to the touch, and hence not fully cured, even after the ink had been subjected to a UV-dose of greater than 1000 mJ/cm$^2$. This result indicates the problem of oxygen inhibition on the surface cure of UV-curable inks, especially inkjet inks.

Ink Example 3 was cured under the action of the emissions from a H-bulb and an LED light source (separately), as described previously. The ink was cured with various UV-doses and the level of migratable components was determined. Cured films of Ink Example 3 were then overprinted with OPV Example 2 and subsequently subjected to UV-cure under the emissions from an H-bulb. The cure doses that both the ink and OPV were exposed to, along with the migratable components from the cured films are given in Table 6.

TABLE 6

Migratables from Cured Film Combinations of Ink Example 3 and OPV Example 2.

| Ink UV-Dose H-Bulb (mJ/Cm$^2$) | Ink UV-Dose LED (mJ/Cm$^2$) | OPV UV-Dose H-Bulb (mJ/Cm$^2$) | DPGDA | DDA | VEEA | Mesitaldehyde |
|---|---|---|---|---|---|---|
| 300 | — | No OPV | 3,500 | 4,750 | 1150 | 14.2 |
| — | 300 | No OPV | 11,000 | 21,000 | 3850 | 43 |
| No Ink | | 150 | 0.8 | 2.7 | — | — |
| No Ink | | 200 | <0.5 | 0.8 | — | — |
| 50 | — | 250 | <0.5 | <0.5 | <0.5 | 1.1 |
| 50 | — | 200 | 2.4 | 4.8 | <0.5 | 2.6 |
| 50 | — | 150 | 1.8 | 7.1 | <0.5 | 2.7 |
| 100 | — | 200 | <0.5 | <0.5 | <0.5 | 1.1 |
| — | 100 | 200 | 1.6 | 3.7 | 3.6 | 4.2 |
| — | 100 | 150 | 3.1 | 7.1 | 8.8 | 4.1 |
| — | 50 | 200 | 8.8 | 33 | 1.1 | 4.5 |

The results in Table 6 clearly demonstrate that the very poor surface cure of Ink Example 3 results in very high levels of migratables from cured films. However, when OPV Example 2 is applied over 'pinned' layers of this ink and subsequently cured, there is a very dramatic decrease in the level of migratable components, achieving in most cases less than 10 ppb, a level at which the ink-OPV combination would be suitable for the printing of food packaging. These results indicate an in-line process of achieving printed matter (which would be suitable for food packaging) via a combination of LED(UV)-pinning of the ink followed by standard UV-curing of a OPV according to the invention, using the light emitted by a medium pressure mercury lamp (H-Bulb).

Ink Example 4

Ink Example 4 was prepared according to the procedure above with a composition as indicated in Table 7.

TABLE 7*

Composition of Ink Example 4.

| Component | Concentration (%) |
|---|---|
| DPGDA | 33.3 |
| 3-MePDDA | 30.0 |

TABLE 7*-continued

Composition of Ink Example 4.

| Component | Concentration (%) |
|---|---|
| VEEA | 20.0 |
| CN3715LM | 1.0 |
| Irgacure 819 | 2.0 |
| Genopol TX | 3.0 |
| Genorad 16 | 1.2 |
| Cyan Dispersion 1 | 9.5 |
| Total | 100 |
| Viscosity @ 45° C. (mPa · s) | 5.73 |

*Cyan Dispersion 1 = a dispersion containing 25.0% (w/w) of Pigment Blue 15:4, the remainder comprising the dispersant (Efka 7476), stabilizers and NPG(PO)DA Comparative OPV Example 1

A water-based OPV was prepared to demonstrate the principal of protecting the underlying partially UV-cured ink from atmospheric oxygen during the second UV-curing stage. This OPV was prepared by blending 40.0% of deionized water with 5.0% ethanol and 50.0% of PEU3500, a polyurethane dispersion from Necarbo.

Ink example 4 was applied to the PET film and cured under the action of a H-bulb. An initial dose of 100 mJ/cm$^2$ was used in the first curing step followed by a dose of 150 mJ/cm$^2$ in the second UV-curing step. In a first experiment the ink was cured without applying any OPV. In a second experiment, Ink Example 4 was cured at 100, followed by 150 mJ/cm$^2$ and then a 12 µm layer of Comparative OPV Example 1 was applied and evaporatively dried. In a third experiment, Ink Example 4 was cured at 100 mJ/cm$^2$, Comparative OPV Example 1 was applied (12 µm) and evaporatively dried and then the combined Ink-OPV layer was cured at 150 mJ/cm$^2$. The migratable components from these prints were determined in the manner previously described. Table 8 provides the migratable results for these experiments.

TABLE 8

Migratables from Cured Film Combinations of
Ink Example 4 and Comparative OPV Example 1.

| Component | Ink Example 4 Cured at 100 plus 150 mJ/cm$^2$ (H-Bulb) | Ink Example 4 Cured at 100 plus 150 mJ/cm$^2$ (H-Bulb), overprinted with OPV Comparative Example 1 | Ink Example 4 cured at 100 mJ/cm$^2$, overprinted with OPV Comparative Example 1, then cured at 150 mJ/cm$^2$ |
|---|---|---|---|
| NPGPODA | 705 | 1060 | 20 |
| DPGDA | 1460 | 2550 | 37 |
| 3-MePDDA | 1410 | 1840 | 44 |
| VEEA | 465 | 630 | 4.5 |
| Mesitaldehyde | 27 | 13 | 3.0 |
| CN3715LM | ND | ND | ND |

Table 8 shows that when the water-based OPV, Comparative OPV example 1, was applied over the ink cured at a total of 250 mJ/cm$^2$, there was no observable decrease in the level of migratable monomer. Indeed, the water-based OPV seemingly increased the level of migration from the ink to the LDPE film. However, when the water-based OPV was applied to the partially cured ink, evaporatively dried, and the ink-OPV layer subjected to a second UV-curing process, a large decrease in the amount of migratable components, especially of the migratable monomer, was observed. This finding supports the notion of an OPV protecting an underlying UV-curable ink from atmospheric oxygen so that a second UV-curing process can achieve more complete cure of the ink.

All references cited herein are herein incorporated by reference in their entirety for all purposes.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the invention.

We claim:

1. A printing process comprising:
   (a) applying a UV-curable ink on a substrate;
   (b) applying UV energy to partially cure the UV-curable ink of step (a);
   (c) applying an overprint varnish on the partially cured UV-curable ink; and
   (d) applying UV energy to cure the UV-curable ink,
   wherein, the UV-curable ink comprises one or more photoinitiators in an amount that is less than 6% by weight of the total weight of the UV-curable ink; and wherein greater than 50% by weight of the photoinitiators in the UV-curable ink have principal absorption bands greater than 300 nm.

2. The printing process of claim 1, wherein the overprint varnish is UV-curable, and comprises one or more photoinitiators.

3. The printing process of claim 1 wherein the UV-curable ink is a pigmented inkjet fluid.

4. The printing process of claim. 1, wherein the amount of photoinitiators in the UV-curable ink is less than 5% by weight of the total weight of the UV-curable ink.

5. The minting process of claim 1, wherein the amount of photoinitiators in the UV-curable ink is less than 4% by weight of the total weight of the UV-curable ink.

6. The printing process of claim 1, wherein the amount of photoinitiators in the UV-curable ink is less than 3% by weight of the total weight of the UV-curable ink.

7. The printing process of claim 1, wherein the UV-curable ink has a viscosity of less than 15.0 mPa·s at 50° C.

8. The printing process of claim 1, wherein the photoinitiators in the UV-curable ink are selected from the group consisting of: thioxanthone, phosphine oxide, α-aminoketone, 4,4'Bis(alkylamino)benzophenone, 4-(Dialkylamino) benzophenone, anthraquinone types and blends thereof.

9. The printing process of claim 1, wherein the overprint varnish is applied by a process selected from inkjet, flexographic printing, gravure printing, offset printing and roller coating.

10. The printing process of claim 2, wherein the overprint varnish comprises one or more photoinitiators selected from the group consisting of: benzophenone, hydroxy-ketone, benzyldimethyl ketal, phenylglyoxalate, benzoin, benzoin ethers, dialkoxyacetophenone types and blends thereof.

11. The printing process of claim 2, wherein greater than 50% by weight of the photoinitiators in the overprint varnish have principal absorption hands below 300 nm.

12. The minting process of claim 1, wherein the overprint varnish applied over the UV-curable ink has a UV-energy absorbance of less than 1.0 at wavelengths greater than 340 nm.

13. The printing process of claim I, wherein the overprint varnish applied over the UV-curable ink has a UV-energy absorbance of less than 1.3 at wavelengths greater than 300 nm.

14. The printing process of claim 1, wherein the UV-energy is applied in step (b) at a dose of less than 300 mJ/cm$^2$.

15. The printing process of claim 1, wherein the UV-energy is applied in step (d) at a dose of less than 400 mJ/cm$^2$.

16. A printed substrate produced by the process of claim 1.

17. The printed substrate of claim 16 is a pharmaceutical, food, or personal care application packaging.

18. A printed or coated article comprising:
   a substrate;
   a first UV-curable ink layer applied on the substrate;
   a second layer of overprint varnish applied on top of the first ink layer;
   wherein the UV-curable ink comprises one or more photoinitiators in an amount that is less than 6% by weight of the total weight of the UV-curable ink; and wherein greater than 50% by weight of the photoinitiators in the UV-curable ink have principal absorption bands greater than 300 mn.

19. The printed or coated article of claim 18, wherein the UV-curable ink is a pigmented inkjet fluid.

20. The printed or coated article of claim 18, wherein the amount of photoinitiators in the UV-curable ink is less than 4% by weight of the total weight of the UV-curable ink.

21. The printed or coated article of claim 18, wherein the overprint varnish comprises one or more photoinitiators.

22. The printing process of claim 1, wherein after step (d), the amount of migratable components in the UV-curable ink is less than 10 ppb.

* * * * *